United States Patent [19]

Barder et al.

[11] Patent Number: 5,196,267

[45] Date of Patent: Mar. 23, 1993

[54] PROCESS FOR COATING SILICA SPHERES

[75] Inventors: Timothy J. Barder, Addison; Philip D. DuBois, Lisle, both of Ill.

[73] Assignee: Allied-Signal Inc., Morris Township, Morris County, N.J.

[21] Appl. No.: 718,682

[22] Filed: Jun. 21, 1991

[51] Int. Cl.$^5$ .............................................. B32B 9/04
[52] U.S. Cl. .................................. 428/404; 423/339; 427/215; 502/8
[58] Field of Search ............... 427/215, 217; 423/335, 423/338, 339; 428/404, 406; 502/8, 10

[56] References Cited

U.S. PATENT DOCUMENTS

| | | | |
|---|---|---|---|
| 1,985,343 | 12/1934 | Connolly et al. | 23/233 |
| 3,535,232 | 10/1970 | Lawrance et al. | 208/111 |
| 3,864,142 | 2/1975 | Kovarik | 117/100 |
| 4,113,658 | 9/1978 | Geus | 252/454 |
| 4,567,030 | 1/1986 | Yuasa et al. | 423/326 |
| 4,764,497 | 8/1988 | Yuasa et al. | 502/235 |
| 4,775,520 | 10/1988 | Unger et al. | 502/8 |
| 4,983,369 | 1/1991 | Barder et al. | 423/338 |

FOREIGN PATENT DOCUMENTS

| | | |
|---|---|---|
| 601451 | 8/1934 | Fed. Rep. of Germany . |
| 2548523 | 1/1977 | Fed. Rep. of Germany . |
| 1553174 | 1/1969 | France . |
| 62-171914 | 7/1987 | Japan .................................. 423/339 |
| 01085140-A | 3/1989 | Japan . |
| 01085141-A | 3/1989 | Japan . |

OTHER PUBLICATIONS

Anderson et al., "New Routes to Supported Bimetallic Rhodium-Tin Catalysts" Nov./1990, pp. 241-244.

Primary Examiner—Shrive Beck
Assistant Examiner—Terry J. Owens
Attorney, Agent, or Firm—Harold N. Wells; Mary J. Boldingh; Gerhard H. Fuchs

[57] ABSTRACT

Silica microspheres formed by hydrolysis of a silica precursor having a mean diameter in the range of about 0.1 to 10 $\mu$m are provided with a thin surface layer, often a monolayer, of a metal to provide the appearance of a solid particle of the metal as its oxide. The microspheres are contacted with an aqueous or alcoholic solution of a metal compound to deposit the surface layer.

26 Claims, 2 Drawing Sheets

PROCESS FOR COATING SILICA SPHERES

This invention relates to an improved process for coating small particles of silica. Such particles typically are very small spheres, with diameters of about 0.1 to 10 $\mu$m. They have many potential applications, such as catalyst supports, advanced ceramics and adsorbents.

Particles in the range of 0.1 to 1.0 $\mu$m were prepared by Yuasa et al., as discussed in U.S. Pat. Nos. 4,567,030 and 4,764,497. The patentees incorporated metals from Groups I, II, III, and IV of the Periodic Table with hydrolyzable silicon compounds and formed particles containing both silica and the selected metals as their oxides. Yuasa et al. teach that both silica and another metal oxide should be present in order to prepare uniform spherical particles. The method employed by Yuasa et al. inherently will distribute the metals uniformly throughout the silica spheres.

In Japanese published patent applications J01/085140A and J01/085141A a noble metal is placed on the surface of a silica support by first contacting the silica with a silane compound having an amino group and then contacting the treated silica with an aqueous solution of a noble metal salt, which is subsequently reduced to the metal.

S. L. Anderson et al., Materials Research Society Extended Abstract EA-24, 1990, published the results of their tests of catalysts prepared by depositing Rh-Sn from a new [{(COD)Rh}$_2$Sn(OEt)$_6$] organic metallic cluster on 0.27 $\mu$m silica spheres. The Rh and Sn are shown to be small metal particles distributed over the surface of the spheres. There was no indication that the authors were attempting complete coverage of the surface to create the appearance of a metal oxide sphere.

In U.S. Pat. No. 4,983,369, we disclose a method for producing highly uniform microspheres having an average diameter of 0.1 to 10 $\mu$m. We now have found a method for producing a thin surface coating of various metals on the surface of such spheres so that they can be said to mimic solid metal oxide spheres.

SUMMARY OF THE INVENTION

Silica particles, especially silica microspheres having an average diameter of about 0.1 to 10 $\mu$m, have many applications, particularly as catalysts. They may be coated according to the invention in order to appear to be, or mimic, spheres of a different composition. This may be done by depositing a very thin surface layer, say up to about 0.1 $\mu$m, often only one or more monomolecular layers, of a metal which appear to be metal oxides. The metals may be one or more members of the group consisting of noble metals, transition metals, rare earth metals and representative metals. Preferred metal compounds are the alkoxides, acetates, carboxylates, nitrates, chlorides, and acetylacetonates. The acetates and alkoxides are particularly preferred.

The silica microspheres having a uniform size (i.e., monodisperse) between about 0.1 to 10 $\mu$m may be prepared by forming a solution combining a hydrolyzable silica precursor, (e.g., tetraethylorthosilicate), an alcohol (e.g., ethanol), ammonia, and water in such proportions that two liquid phases form. Microspheres are formed by hydrolysis of the silica precursor and grown to the desired size. Thereafter, a second solution of a soluble compound of at least one metal is added to the first solution which now contains microspheres. The metal compound deposits a thin surface layer comprising the metal on the surface of the microspheres, which are then recovered from the solution by various methods.

In another embodiment silica microspheres are harvested from solution, redispersed in water or other liquid at a temperature of 15° to 100° C., and thereafter an aqueous or alcoholic solution of the selected metal compounds is added. After contacting for a suitable length of time, such as 0.5 to 5 hours, the coated particles are recovered, washed and dried before use.

DESCRIPTION OF THE PREFERRED EMBODIMENTS

Producing the Spheres

Figure 1:
FIG. 1 is a photograph taken by TEM illustrating relatively thick surface coatings on a silica sphere.

In U.S. Pat. No. 4,983,369, we disclosed a new method for producing highly uniform microspheres of silica and that patent is incorporated herein by reference. The method may be briefly summarized as follows.

In general, the process combines a hydrolyzable silica precursor, an alcohol, ammonia, and water in proportions such that two phases would form. Typically, two precursor solutions will be prepared. The first solution contains a hydrolyzable silica precursor, such as a tetraalkoxysilane, represented by formula Si(OR)$_4$ where R is a lower alkyl group. Tetraethoxysilane, with or without a solvent such as an alcohol, is a preferred source of the silica microspheres. When an alcohol solvent is used, typically it will be the same as is produced by hydrolysis of the silica precursor. The hydrolyzable silica precursor reacts with water to decompose into silica, probably via intermediate compounds.

The second precursor solution is an aqueous ammonia solution, optionally containing an alcohol. Typically, the same alcohol as is produced by hydrolysis of the tetraalkoxysilane is employed. Thus, ethanol would be used when the silica precursor is tetraethoxysilane.

The composition of the precursor solutions will be determined by the desired composition of the reacting mixture. Thus, the actual composition of each precursor solution may be adjusted and the rate at which the solution is added may be varied to provide the desired composition in the reacting mixture. However, the composition of the combined solutions will be such that the reaction mixture initially forms two phases.

Broadly, such compositions may be 20 to 50 wt. % silica precursor, 5 to 30 wt. % alcohol, 40 to 70 wt. % water, and 5 to 10 wt. % ammonia. Preferred compositions would be within the range of 25 to 35 wt. % silica precursor, 5 to 10 wt. % alcohol, 50 to 60 wt. % water, and 5 to 10 wt. % ammonia.

The length of time the combined solutions remain as two phases is believed to be determined primarily by the amount of alcohol present at any given time, which is the sum of the alcohol initially present, if any, plus the alcohol added as a solvent with the precursor solutions and the alcohol produced by hydrolysis of the silica precursor compound.

Seed particles are not required, although they may be used if desired. The precursor solutions may be introduced into an empty vessel in the absence of seed particles. However, in all cases the composition of the precursor solutions is such that two liquid phases would form when the solutions are mixed. This contrasts with the prior art which employed a large amount of alcohols and inherently would have formed a single phase solution.

The two-phase solution after a period of time becomes single phase, because sufficient ethanol has been formed to dissolve the remaining tetraethoxysilane and its reacting intermediates. Thereafter, the particles can be grown by continuing to add the two-phase precursor solutions until the microspheres reach the desired size, which typically will be between about 0.1 and 10 μm.

The process may be carried out at near room temperature, but is considered to be feasible at temperatures in the range of 10° to 50 C. The temperature would be expected to affect reaction rates and solubility of the reactants and an optimum temperature should be selected. Pressure is not considered an important variable and elevated or sub-atmospheric pressures may be used. The degree of mixing of the reactants is believed to affect the results. Generally, low shear mixing will be employed.

After the microspheres have been formed and reached the desired size, the growth process will be stopped and the surface layer of metal or its oxide is added to the surface by introducing a solution of a soluble metal compound, either directly into the mother liquor which contains the microspheres or into a liquid suspension of the microspheres after they have been recovered from the mother liquor and redispersed in water or other suitable liquid. The conditions under which the microspheres have been grown are believed to provide surface hydroxyl groups which react with the metal compounds to leave a thin surface layer.

Metal Compounds

In principle, any metal could be deposited on silica particles according to the invention. If a suitable metal compound is available which is water or alcohol soluble, deposition of a surface layer should be possible. It should be understood that while the surface layer is considered to be metal oxide, the metal atoms are also believed to be bonded to the silica spheres via a Si-0-metal bond at the surface. The actual form of the surface layer will depend on a number of factors and is not necessarily solely the metal oxide. The noble metals, transition metals, rare earth metals, and representative metals (i.e., metals of groups IIIa, IVa, Va, and VIa of the Periodic Table) are of particular interest. Many metals have been successfully deposited as will be seen in the examples below. More particularly, metals within the group consisting of Al, Ti, Cr, Co, Ni, Cu, Y, Zr, Ru, Rh, Pd, Ag, Sn, Pt, Hg, Ce, Pr, Sm, Er, Nd, Ta, and La have been deposited. Chromium is a metal of particular interest, since when deposited on microspheres prepared by this procedure it is a catalyst for high density polyethylene. Noble metals may be deposited where the coated spheres are to be used as catalysts, e.g., automotive exhaust, oxidation of organics, polymerization and the like. Silver can be deposited on silica for use in the oxidation of ethylene to ethylene oxide. Coatings of more than one metal also may be applied.

Since the metal compounds preferably are water or alcohol soluble, the acetates, alkoxides, carboxylates, nitrates, chlorides and acetylacetonoates are useful, especially the alkoxides and acetates. Other types of compounds, such as complex metal ion salts, may also be useful.

Deposition of Metal Compounds

The process of the invention involves two essential steps. First, the microspheres are prepared as previously described. Thereafter, the microspheres are contacted with an aqueous or alcoholic solution of the selected metal compound for a suitable period of time and then the coated spheres are recovered.

The process by which the microspheres are prepared is believed to provide hydroxyl groups on the outer surface with which the metal compounds may react without precipitation from solution. Additional hydroxylation may occur in those instances when the microspheres are recovered and then redispersed in hot water before being contacted with the metal compounds.

After the silica microspheres have been prepared, the metal compound is introduced, which is believed to react with the hydroxyl groups and bond the metal to the silica surface. Typically, an aqueous or alcoholic solution of the metal compound having a concentration of about 0.1 to 30% by weight will be used. This may be done by recovering the spheres and treating them with the metal compound solution or alternatively, the solution is introduced into the mother liquor containing the microspheres after they have been formed. The metal compound solution is maintained in contact with the silica particles to ensure coverage of the surface has been obtained, which may require from 0.5 to 5 hours. The temperature of the solution may be maintained in the range of about 15° to 100° C.

After the metal compound has been fully reacted, the coated silica particles are recovered, washed of excess solution, and dried before being used or further processed into other forms. The spheres will have very thin layers of the deposited metals, often a few monolayers, although they may be up to about 0.1 μm thick.

EXAMPLE 1

Microspheres may be harvested from the mother liquor in which they are formed and then redispersed in water before depositing a thin surface layer. Fifty (50) grams of 1.1 μm diameter silica spheres prepared by the method of our U.S. Pat. No. 4,983,369 were redispersed in 400 mL deionized water with magnetic stirring. After about 16 hours contacting, the mixture was dispersed by ultrasonic agitation for 30 minutes and then heated to 90° C. with stirring for 30 minutes. 0.19 grams of chromium acetate hydroxide $[Cr_3(OH)_2(OAc)_7]$ dissolved in 15-20 mL of deionized water was then added to the dispersed silica spheres. The mixture was then removed from the source of heat and stirred overnight with gradual cooling to ambient temperature. The silica spheres were settled, the liquid decanted, and the spheres redispersed in 400 mL of deionized water and stirred overnight. Thereafter, the redispersed mixture was centrifuged to recover the spheres, which were then air dried at room temperature. The amount of chromium deposited was determined by atomic absorption spectroscopy to be about 0.30 wt. percent Cr based on the silica content.

EXAMPLE 2

Coatings also may be applied in-situ at the end of the process for forming microspheres by adding the metal solution to the media in which the spheres have been grown. 100 cc of tetraethylorthosilicate (TEOS) was added to 200 cc of a basic alcoholic ammoniacal solution (13.5 vol.% ethanol, 48 vol. % deionized water and 38.5 vol. % of 29 wt % $NH_3$) and stirred for 1.5 hours. Spheres averaging 0.3–0.5 μm diameter are produced. 20 mL of 1 wt. % solution of $Cr_3(OH)_2(OAc)_7$ in water is added to the mother liquor without harvesting the spheres. The mixture is stirred for 1–5 hours and then centrifuged to recover the spheres, which are then redispersed in water and centrifuged a second time to of Examples 1 and 2, except as indicated to have been modified. The results are given in the following table. Note that the concentration of the metal in solution is adjusted so that if all of the metal were deposited on the surface, the silica would have the amount given (i.e., "attempted"). The actual amount measured is generally less than the theoretical amount. The instances where a greater than theoretical amount was measured have not been explained.

TABLE A

CHROMIUM DEPOSITION RESULTS

| Sample | Chromium Source | Cr Deposition Attempted | Sphere Diameter (μ) | Mass % Cr (Actual) | Deposition Method | Monolayer** |
|---|---|---|---|---|---|---|
| A | $Cr_3(OH)_2(OAC)_7$* Basic Acetate | 1 | 0.3–0.5 | 0.95 | Post-Harvested $H_2O$-90° C. (Ex. 1) | 3.3 |
| B | $Cr_3(OH)_2(OAC)_7$* Basic Acetate | 1 | 1.1 | 0.30 | Post-Harvested $H_2O$-90° C. (Ex. 1) | 2.8 |
| C | $Cr_3(OH)_2(OAC)_7$* Basic Acetate | 1 | 1.5 | 0.64 | Post-Harvested $H_2O$-90° C. (Ex. 1) | 8.2 |
| D | $Cr_3(OH)_2(OAC)_7$* Basic Acetate | 11 | 2.0 | 1.17 | Post-Harvested $H_2O$-90° C. (Ex. 1) | 20 |
| E | $Cr_3(OH)_2(OAC)_7$* Basic Acetate | 1 | 0.3–0.5 | 0.46 | Insitu (Ex. 2) | 1.6 |
| F | $Cr(OAc)_3.H_2O$ | 1 | 1.5 | 0.58 | Post-Harvested $H_2O$-90° C. (Ex. 1) | 7.4 |
| G | $Cr(NO_3)_3$ | | 0.3–0.5 | 0.27 | Insitu (Ex. 2) | 0.93 |
| H | $CrO_2Cl_2$ | 1 | 1.5 | 720 ppm | Post Harvested EtOH-°C. (Ex. 2 Modified) | 0.92 |

*OAc = acetate
**Number of monolayers based on 4.5 SiOH groups per $nm^2$ of surface and assuming one metal atom per SiOH group recover the spheres. The spheres are found to have a surface coating of about 0.46 wt. percent chromium.

EXAMPLE 3

Coatings may also be applied to larger spheres formed by incremental addition of the TEOS and the basic solution until the desired sphere diameter has been reached. Then, the procedure described in Examples 1 and 2 is followed to produce a surface coating on the spheres, after which they are harvested.

EXAMPLE 4

A series of preparations were carried out using chromium compounds and following the general procedure

EXAMPLE 5

Another series of preparation were carried out using rare earth compounds, but following the general procedures of Examples 1 and 2, except as indicated to be modified. The results are given in the following table.

TABLE B

RARE EARTH COATINGS

| Sample | Rare Earth Acetate Salt Used | Rare Earth Deposition Attempted (wt %) | Sphere Diameter (μ) | Mass % Rare Earth (Actual) | Deposition Method | Monolayer |
|---|---|---|---|---|---|---|
| I | Yttrium | 1 | 0.3–0.5 μm | 0.70 | Post Harvested $H_2O$-90° C. (Ex. 1) | 1.4 |
| J | Praseodymium | 1 | " | 0.88 | Post Harvested $H_2O$-90° C. (Ex. 1) | 1.1 |
| K | Erbium | 1 | " | 0.99 | Post Harvested $H_2O$-90° C. (Ex. 1) | 1.1 |
| L | Cerium | 1 | " | 1.03 | Post Harvested $H_2O$-90° C. (Ex. 1) | 1.3 |
| M | Lanthanum | 1 | " | 0.43 | Insitu (Ex. 2) | 0.55 |
| N | Neodymium | 1 | " | 1.48 | " | 1.8 |
| O | Samarium | 1 | " | 0.26 | " | 0.31 |
| P | Praseodymium | 1 | " | 0.68 | " | — |
| Q | Lanthanum | 1 | " | 0.37 | $H_2O$-90° C. | — |
| R | Samarium | 1 | " | 0.67 | " | — |
| S | Neodymium | 1 | " | 0.75 | " | — |

EXAMPLE 6

Further tests were made with various transition metal compounds other than chromium, but following the same general procedures. The results are given in the following table.

TABLE C

TRANSITION METAL COATINGS

| Sample | Metal Salt | Metal Deposition Attempted | Sphere Diameter ($\mu$) | Mass % Metal (Actual) | Deposition Method | Monolayer |
| --- | --- | --- | --- | --- | --- | --- |
| P | Co(OAc)$_3$ | 1 | 0.3–0.5 | 0.93 | Post-Harvested H$_2$O-90° C. (Ex. 1) | 2.8 |
| Q | Ru(acac)$_3$* | 1 | " | 345 ppm | Post-Harvested H$_2$O-90° C. (Ex. 1) | 0.061 |
| R | Rh2(OAc)$_4$ | 1 | " | 0.41 | Post-Harvested H$_2$O-90° C. (Ex. 1) | 0.71 |
| S | Ni(OAc)$_2$ | 1 | " | 0.96 | Post-Harvested H$_2$O-90° C. (Ex. 1) | 2.9 |
| T | Hg(OAc)$_2$ | 1 | " | 1.20 | Post-Harvested H$_2$O-90° C. (Ex. 1) | 1.1 |
| U | Pd(OAc)$_2$ | 1 | " | 0.47 | Post-Harvested H$_2$O-90° C. (Ex. 1) | 0.79 |
| V | Pt(acac)$_2$ | 1.3 | " | 1.04 | Post-Harvested H$_2$O-90° C. (Ex. 1) | 0.95 |
| W | Cu(OAc)$_2$ | 1 | " | 1.06 | Post-Harvested H$_2$O-90° C. (Ex. 1) | 3.0 |
| X | Ag(OAc) | 1 | " | 0.95 | Post-Harvested H$_2$O-90° C. (Ex. 1) | 1.6 |
| Y | Zr(OPr)$_4$** | 0.25 | 1.5 | 0.15 | Post-Harvested H$_2$O-90° C. (Ex. 1) (Redispersed in Ethanol 25° C.) | 0.29 |
| Z | H$_2$PtCl$_6$ | | 0.3–0.5 | 0.33 | Insitu (Ex. 2) | 0.30 |

*acac = acetylacetonate
**OPr = n-propoxide

EXAMPLE 7

Tests were made with titanium compounds using the procedures of Examples 1 and 2, except where indicated to be modified. The results are given in the following table.

EXAMPLE 8

Tests were made with sequentially deposited layers of different metals using the procedures of Examples 1 and 2, except where indicated to have been modified. The results are given in the following table.

TABLE D

TITANIUM (IV) COATINGS

| Sample | Titanium Starting Material | Ti Deposition Attempted (wt. %) | Sphere Diameter ($\mu$) | Mass % Ti | Deposition Method (Actual) | Monolayer |
| --- | --- | --- | --- | --- | --- | --- |
| AA | Ti(OPr$^i$)$_4$* | 1 | 1.5 | 531 ppm | Post-Harvested (Ex. 1) (Redispersed in EtOH 25° C.) | 0.74 |
| BB | Ti(OBu$^n$)$_4$** | 1 | " | 542 ppm | Post-Harvested (Ex. 1) (Redispersed in EtOH 25° C.) | 0.75 |
| CC | Ti(2-Et-Hexoxide)$_4$ | 1 | " | 626 ppm | Post-Harvested (Ex. 1) (Redispersed in EtOH 25° C.) | 0.87 |
| DD | Ti(OEt)$_4$ | 1 | " | 220 ppm | Post-Harvested (Ex. 1) (Redispersed in EtOH 25° C.) | 0.31 |
| EE | " | 1 | " | 0.39 | Post-Harvested (Ex. 1) (Redispersed in EtOH 60° C.) | 5.4 |
| FF | " | 1 | " | 0.63 | Post-Harvested (Ex. 1) Redispersed in (1) H$_2$O 90° C. (2) EtOH 60° C. | 8.8 |
| GG | Ti(acac)$_2$—(OPr$^i$)$_2$ | 1 | 1.7 | 0.08 | Redispersed in (1) H$_2$O 90° C. (2) EtOH 25° C. | 1.3 |
| HH | " | 1 | " | 0.14 | Redispersed in (1) H$_2$O 90° C. (2) EtOH 60° C. | 2.2 |
| II | " | 1 | 0.3–0.5 | 0.67 | Redispersed in H$_2$O 90° C. only | 2.5 |
| JJ | " | 1 | " | 0.38 | Insitu (Ex. 2) | 1.4 |
| KK | " | 1 | " | 0.96 | Insitu (Two Additions of Ti Compound) | 3.6 |

*OPr$^i$ = isopropoxide
**OBu$^n$ = n-butoxide

TABLE E

MULTIPLE METAL COATINGS

| Sample | Metal Starting Material | Metal Deposition Attempted | % Metal deposited (Actual) | Sphere size | Deposition Procedure | Monolayer |
|---|---|---|---|---|---|---|
| LL | Ti(acac)$_2$(OPr$^i$)$_3$ | 1.0 | 0.91 | " | Separate addn's 90° C. H$_2$O | 3.4 |
|  | Cr$_3$(OAc)$_7$(OH)$_2$ | 1.0 | 0.18 |  |  | 0.62 |
| MM | Al(OBu$^s$)$_3$ | 1.0 | 0.51 | " | Separate addns 90° C. H$_2$O | — |
| NN | Ce(OAc)$_3$ | 1.0 | 0.56 | " | " | — |

EXAMPLE 9

Comparative

Commercially available non-porous silica from Cabot Corporation, Cabosil M-5, was dispersed in deionized water and heated to 90° C. for one hour. To 50 gms of this silica was added 1.93 gms of Cr$_3$(0Ac)$_7$(OH)$_2$ dissolved in 15 cc of deionized water and stirred for one hour. Then the mixture was cooled and the silica harvested by centrifuging. The solids were redispersed in deionized water and centrifuged again, after which they were dried at 80° C. for 6 hours. The silica as received was reported to have a surface area of 200±25 m$^2$/gm with the primary particles being 0.014 μm linked together to form larger silica particles.

The procedure described above was repeated with 50 gms of silica spheres produced according to Example 2 and having a diameter of 0.3–0.4 μm and a surface area of 13.6 m$^2$/gm.

Analysis of the silica spheres by Inductively Coupled Plasma showed that the M-5 spheres contained 0.24 wt. % Cr while the spheres of the invention contained 0.95 wt. %. Since the ratio of the surface areas of the spheres is about 15/1 it was concluded that spheres made by the method of the invention are capable of being coated with larger amounts of metal oxide coatings than the commercial fumed silica.

EXAMPLE 10

10.0 g of 1.5 μ spheres prepared by Example 3 were dispersed in 200 cc of absolute ethanol containing 6.8 g of deionized water. A second solution of 11.9 g of titanium tetraethoxide dissolved in 100 cc of absolute ethanol was added over a period of 1 hr to the silica dispersion and the resulting mixture allowed to stir for 16 hrs. The spheres were harvested by centrifugation. Ti analysis was 6.47% by mass. The spheres were embedded in epoxy resin and then sectioned with a diamond knife. TEM (Transmission Electron Microscopy) analysis of the spheres showed them to have a relatively thick titanium oxide coating up to about 0.03 μm. One of these samples is shown in FIG. 1 where the surface layer of titanium oxide is clearly visible.

EXAMPLE 11

Figure 2:
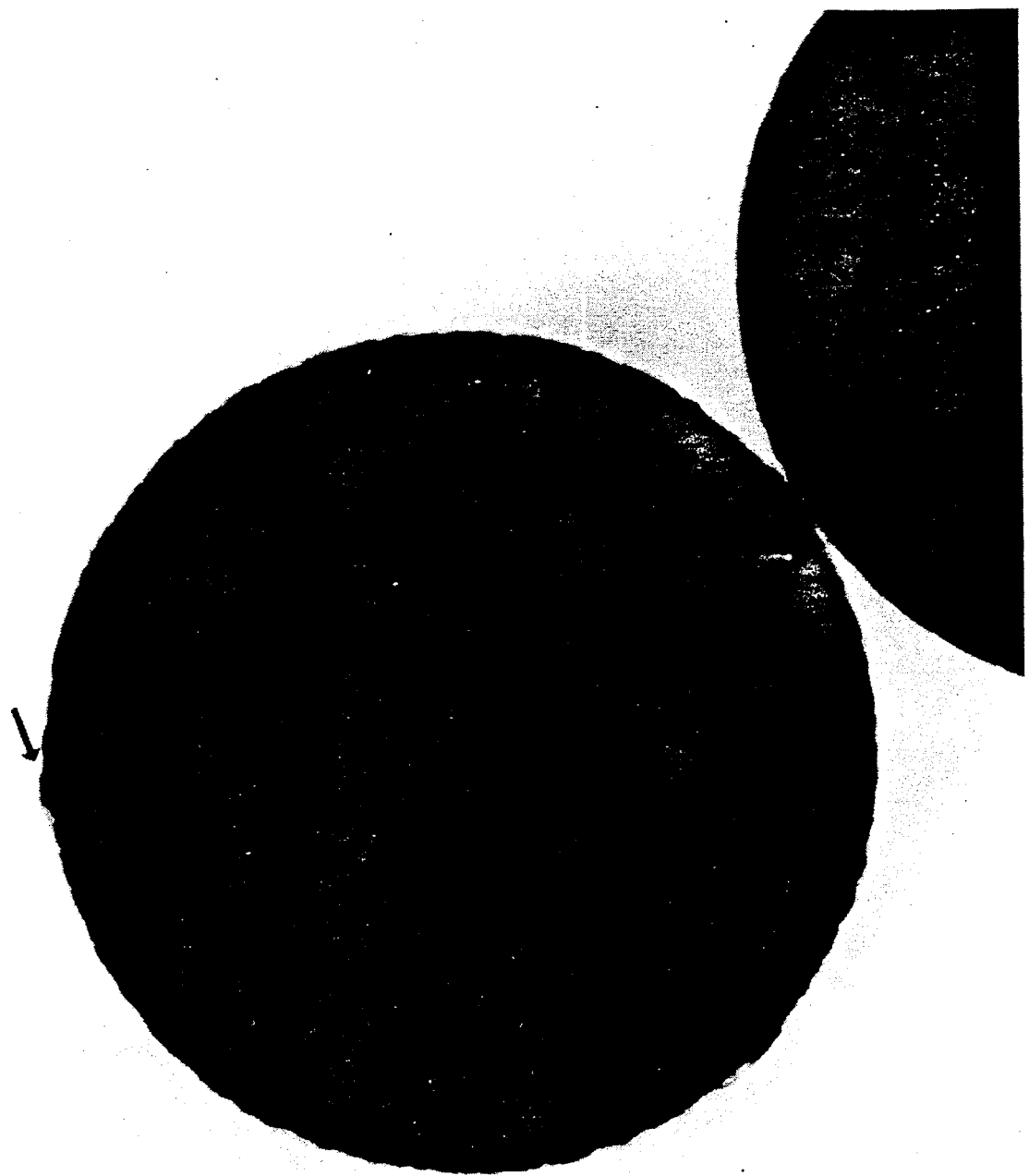
FIG. 2 is a photograph taken by TEM illustrating relatively thin surface coating on a silica sphere.

10.0 g of 1.5 μ spheres prepared by Example 3 were dispersed in 200 cc of absolute ethanol and 0.68 g of deionized water was added with stirring. A solution of 12.1 g of titanium tetraethoxide dissolved in 100 cc of absolute ethanol was added over a period of 20 minutes. The mixture was allowed to stir overnight and the spheres harvested by centrifugation. Ti analysis was 0.40% by mass. These spheres did not show any Ti coating when sectioned as in the previous example since the coating was very thin. However, when a sample of the spheres was dispersed in alcohol and sprayed onto a carbon TEM grid, the thin layer of Ti was detected. It is visible in FIG. 2 as a light surface region on the periphery as indicated by the arrow.

We claim:

1. A process for producing microspheres of silica having a uniform size between about 0.1 and 10 microns diameter and a surface coating comprising a metal comprising:
   (a) forming a first solution combining a hydrolyzable silica precursor, an alcohol, ammonia, and water in proportions such that two liquid phases form;
   (b) forming said microspheres by hydrolysis of said silica precursor of (a);
   (c) adding to the solution containing microspheres after step (b) a second solution of a soluble compound of at least one metal selected from the group consisting of the noble metals, transition metals, rare earth metals, and representative metals;
   (d) maintaining said microspheres in contact with said second solution for a period of time sufficient to deposit a coating of said soluble metal compounds of (c) on said microspheres; and
   (e) recovering the coated microspheres of (d).

2. The process of claim 1 wherein in (a) said hydrolyzable silica precursor, optionally combined with an alcohol forms a first precursor solution and said ammonia and water, optionally containing an alcohol forms a second precursor solution and said first precursor solution and said second precursor solution are combined with said alcohol in (a) to form said first solution.

3. The process of claim 1 wherein the hydrolyzable silica precursor is at least one member of the group consisting of tetraalkoxy silanes and alkyl alkoxysilanes.

4. The process of claim 3 wherein the hydrolyzable silica precursor is tetraethoxysilane.

5. The process of claim 1 wherein said alcohol is at least one member of the group consisting of methanol, ethanol, propanols, butanols, and pentanols.

6. The process of claim 5 wherein said alcohol is ethanol.

7. The process of claim 1 wherein the combined composition of (a) is 20–50% wt. % hydrolyzable silica precursor, 5–30 wt. % alcohol, 40–70 wt. % water, and 5–10 wt. % ammonia.

8. The process of claim 1 wherein said metal compound is selected from the group consisting of acetates, alkoxides, carboxylates, nitrates, chlorides, and acetylacetonoates.

9. The process of claim 8 wherein the metal compound is an acetate, or alkoxide.

10. The process of claim 1 wherein the metal is selected from the group consisting of Al, Ti, Cr, Co, Ni, Cu, Y, Zr, Ru, Rh, Pd, Ag, Sn, Pt, Hg, Ce, Pr, Sm, Er, La, Nd, and Ta.

11. The process of claim 10 wherein the metal is Cr.

12. The process of claim 1 wherein the surface coating has a thickness of up to about 0.1 μm.

13. A process for producing microspheres of silica having a uniform size between about 0.1 and 10 microns diameter and a surface coating comprising a metal comprising:
(a) forming a first solution combining a hydrolyzable silica precursor, an alcohol, ammonia, and water in proportions such that two liquid phases form;
(b) forming said microspheres by hydrolysis of said silica precursor of (a);
(c) recovering the microspheres of (b) and redispersing said recovered microspheres in a liquid;
(d) adding to the redispersed microspheres of (c) a second solution of a soluble compound of at least one metal selected from the group consisting of the noble metals, transition metals, rare earth metals, and representative metals;
(e) maintaining said microspheres in contact with said second solution for a period of time sufficient to deposit a coating of said soluble metal compounds of (c) on said microspheres; and
(f) recovering the coated microspheres of (e).

14. The process of claim 13 wherein in (a) said hydrolyzable silica precursor, optionally combined with an alcohol forms a first precursor solution and said ammonia and water, optionally containing an alcohol forms a second precursor solution and said first precursor solution and said second precursor solution are combined with said alcohol in (a) to form said first solution.

15. The process of claim 13 wherein the hydrolyzable silica precursor is at least one member of the group consisting of tetraalkoxy silanes and alkyl alkoxysilanes.

16. The process of claim 15 wherein the hydrolyzable silica precursor is tetraethoxysilane.

17. The process of claim 13 wherein said alcohol is at least one member of the group consisting of methanol, ethanol, propanols, butanols, and pentanols.

18. The process of claim 17 wherein said alcohol is ethanol.

19. The process of claim 13 wherein the combined composition of (a) is 20–50% wt. % hydrolyzable silica precursor, 5–30 wt. % alcohol, 40–70 wt. % water, and 5–10 wt. % ammonia.

20. The process of claim 13 wherein said metal compound is selected from the group consisting of acetates, alkoxides, carboxylates, nitrates, chlorides, and acetylacetonoates.

21. The process of claim 20 wherein the metal compound is an acetate or alkoxide.

22. The process of claim 13 wherein the metal is selected from the group consisting of Al, Ti, Cr, Co, Ni, Cu, Y, Zr, Ru, Rh, Pd, Ag, Sn, Pt, Hg, Ce, Pr, Sm, Er, La, Nd, and Ta.

23. The process of claim 22 wherein the metal is Cr.

24. The process of claim 13 wherein the surface coating has a thickness of up to about 0.1 μm.

25. A surface coated silica microsphere prepared by the process of claim 1.

26. A surface coated silica microsphere prepared by the process of claim 13.

* * * * *